(12) United States Patent
Koslow

(10) Patent No.: US 6,720,054 B2
(45) Date of Patent: Apr. 13, 2004

(54) DESICCANT SYSTEM INCLUDING BOTTLE AND DESICCANT SHEET

(75) Inventor: Evan E. Koslow, Weston, CT (US)

(73) Assignee: Koslow Technologies Corporation, Orange, CT (US)

( * ) Notice: Subject to any disclaimer, the term of this patent is extended or adjusted under 35 U.S.C. 154(b) by 0 days.

(21) Appl. No.: 10/109,462

(22) Filed: Mar. 27, 2002

(65) Prior Publication Data

US 2003/0186004 A1 Oct. 2, 2003

(51) Int. Cl.[7] .................. B29D 22/00; B29D 23/00; B32B 1/08; B65D 81/26; F17C 11/00
(52) U.S. Cl. .................. 428/36.7; 428/36.6; 428/34.1; 428/36.9; 428/36.91; 428/323; 428/327; 206/204
(58) Field of Search ................ 428/35.7, 36.4, 428/36.6, 36.7, 36.9, 36.91, 36.92, 323, 327, 343, 34.1; 206/204; 34/294, 299; 502/402, 405

(56) References Cited

U.S. PATENT DOCUMENTS

| | | | | |
|---|---|---|---|---|
| 3,260,234 A | * | 7/1966 | Serrano et al. ............. 116/114 |
| 3,833,406 A | * | 9/1974 | White ......................... 117/97 |
| 4,036,360 A | * | 7/1977 | Deffeyes .................... 206/204 |
| 4,341,539 A | | 7/1982 | Gidaspow et al. ............ 55/278 |
| 4,576,841 A | | 3/1986 | Lingemann .................. 428/34 |
| 4,977,009 A | * | 12/1990 | Anderson et al. ............. 429/76 |
| 5,114,003 A | * | 5/1992 | Jackisch et al. ............ 206/204 |
| 5,653,115 A | | 8/1997 | Brickley et al. ............... 62/94 |
| 5,701,891 A | | 12/1997 | Groenke ................. 128/205.29 |
| 6,156,102 A | | 12/2000 | Conrad et al. ................ 95/172 |
| 6,214,095 B1 | | 4/2001 | Logan et al. ................. 96/147 |
| 6,214,255 B1 | * | 4/2001 | Hekal ......................... 252/194 |
| 6,226,890 B1 | | 5/2001 | Boroson et al. .............. 34/472 |
| 6,247,604 B1 | | 6/2001 | Taskis et al. ............... 215/247 |
| 6,299,842 B1 | | 10/2001 | Kozak et al. ............... 422/102 |

OTHER PUBLICATIONS http://www.cpchem.com/osp/processing.asp, pp. 1–2, printed Feb. 25, 2002.

* cited by examiner

Primary Examiner—Harold Pyon
Assistant Examiner—Michael C. Miggins
(74) Attorney, Agent, or Firm—Shirley S. Ma

(57) ABSTRACT

A desiccant system and a method for producing the same wherein a container is provided with a desiccant sheet that is trapped within the container and a water vapor impermeable cover for the container making a water impermeable seal thereto. The sheet may have a first substrate, and optionally, a second substrate, and desiccant particles adhered to the first substrate or trapped between the first substrate and the second substrate. A binder material may fuse the desiccant particles to one another and to the substrates. The sheet may be trapped within the bottle due to its tendency to unfurl to a flat condition, or it may be adhered to an inner surface of the bottle.

12 Claims, 2 Drawing Sheets

DESICCANT SYSTEM INCLUDING BOTTLE AND DESICCANT SHEET

BACKGROUND OF THE INVENTION

1. Field of the Invention

The present invention relates to desiccant systems. More particularly, it relates to systems wherein the contents of a bottle, such as, for example, pharmaceuticals (pills, tablets, capsules) are stored in a low humidity environment.

2. Prior Art

There are a variety of ways to package desiccant materials used to provide humidity control in bottles or enclosures such as those used to store moisture-sensitive scientific instruments, specialty chemicals, or pharmaceuticals. Generally, these consist of packets that are filled with desiccant materials, canisters containing such materials, or solids such as tablets or cylinders containing desiccant. All of these approaches have respective disadvantages.

First, desiccant packages take up space. Thus, they reduce the volume of material that can be stored within an enclosure. In some cases, this may not be a major disadvantage. However, once a sealed enclosure is opened, these desiccant packs can fall out and are often lost. In fact, in some cases, individuals not aware of their purpose tend to discard these packs. Thus, the contents are no longer safeguarded against excessive moisture. In those cases where the desiccant package is retained, it is often removed from the package and exposed to dust, atmospheric moisture and other forms of contamination before being returned to the package. Thus, unwanted bacterial contamination may take place and the contents may no longer be appropriate for consumption.

If small desiccant cylinders are permitted to remain in a bottle containing, for example pills, there is a chance of them being accidentally ingested. While this in itself may not be dangerous, the failure of someone to take a critically required medication, because that person believes it has already been taken, may be extremely dangerous.

Desiccant canisters, while avoiding some of these problems, are expensive to manufacture. The costs involved in making an entire enclosure of a desiccant material are inherently significant.

Accordingly, there is a need for a system for placing and retaining a desiccant in a container so as to overcome the disadvantages inherent in existing desiccant systems.

SUMMARY OF THE INVENTION

It is an object of the present invention to provide a desiccant and container system wherein the usable space available in the container is not significantly reduced by the presence of the desiccant.

It is another object of the invention to provide a desiccant and container system wherein the desiccant material is not easily lost or contaminated.

It is a still another object of the invention to provide a desiccant container system that is easy to manufacture and low in cost.

In accordance with the invention, a sheet of desiccant material is placed in an enclosure or bottle which requires humidity control. The sheet may be sized and shaped so that it can be rolled up, placed through the neck of the bottle, and allowed to expand inside the bottle against the walls thereof. Accordingly, the sheet is then effectively secured in place within the bottle against its walls. It cannot easily be removed from the bottle and lost. Further, it is not subject to exposure to atmospheric moisture, contaminants and bacteria that may be found outside the bottle. Finally, it is not subject to being accidentally ingested.

As used herein, the term "bottle" refers to a bottle, enclosure, or other container, and may include jars, pill bottles, or other similar structures in which moisture sensitive products may be packaged.

The present invention is also directed to a method for producing the container and desiccant system described above. In accordance with the method, a desiccant sheet of appropriate size and shape is rolled into a cylindrical configuration, placed through the neck of the bottle into the interior of the bottle, and then allowed to expand against the walls of the bottle, thus securing the sheet within the bottle. If the opening or neck of the bottle is not smaller in size than the remainder thereof, a small amount of an adhesive may be used to secure the sheet in place.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
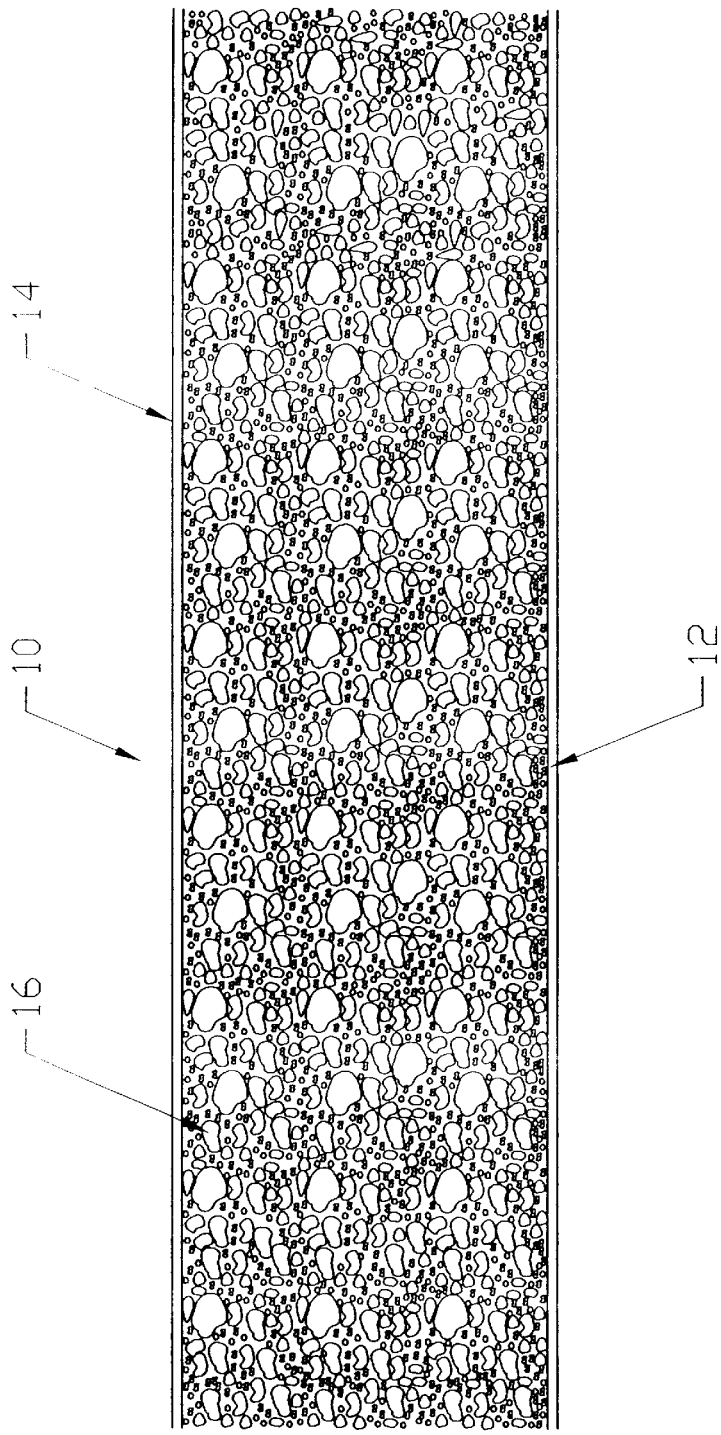
FIG. 1 is a cross section of a desiccant sheet that may be used in the present invention.

Referring to FIG. 1, there is shown a cross sectional view of a desiccant sheet 10 which may be used in the present invention. Although the present invention will be described with reference to the single embodiment shown in the drawings, it should be understood that the present invention can be embodied in many alternate forms of embodiments. In addition, any suitable size, shape or type of elements or materials could be used.

In FIG. 1, a desiccant sheet 10 includes a first substrate 12 and a second substrate 14. Substrates 12 and 14 have, disposed between them a composite layer 16 including particles of a desiccant material, such as for example, silica gel, activated alumina, zeolite or similar material, and a suitable binder material for binding at least a portion of the desiccant particles to each other, and at least a portion of the desiccant particles to one of the substrates 12 and 14. Substrates 12 and 14 are preferably non-woven fabrics such as non-woven polypropylene available from Polymer Group, Inc. (PGI) of North Charleston, S.C., USA, and having a weight of 0.5 to 1.5 ounces per square yard. For example, substrates 12 and 14 may have weights of 1.5 and 1.0 ounces per square yard, respectively. Alternatively, substrates 12 and 14 may have weights of 1.0 and 0.6 ounces per square yard, respectively. It is important that at least one of the substrates 12 and 14 be water vapor permeable so that the desiccant particles can absorb water vapor when sheet 10 is placed in the enclosure or bottle.

Sheet 10 may be formed by the process described in detail in U.S. Pat. Nos. 5,792,513 and 6,077,588, which are incorporated by reference in their entirety, as if fully set forth herein. Materials of this general nature are sold under the trademark PLEKX®, by KX Industries, L.P. of Orange, Conn., USA, the assignee of these patents.

Although shown in this embodiment as a material with two substrates, it will be understood that the medium may be formed with a composite layer of desiccant particles and binder upon a single substrate, in accordance with the process of the above mentioned patent. In addition, multiple layer versions are possible with alternating layers of water vapor permeable substrates and desiccants. A thin sheet 10 is preferred.

The binder used to hold the structure of FIG. 1 together can be low-density polyethylene ("LDPE") binder particles, such as grade FN510, supplied by Equistar Chemicals, L.P. of Tuscola, Ill., USA, and manufactured and sold under the trade name Microethane®. These LDPE particles are primarily in the range of 10 to 30 microns in diameter, with some portion of the size distribution being outside this range. This material can be combined with an additive of approximately one half of one percent (0.5%) of synthetic amorphous precipitated silicon dioxide, specifically a synthetic amorphous silicon dioxide hydrate sold under the name Sipernate® 22LS, supplied by Degussa-Huls, through its Degussa Corporation Pigment Group of Richfield Park, N.J., USA.

The silica gel particles have an average size of 149 microns, with an approximately normal distribution about that size. The mixture of silica gel particles and binder may be applied at a density of 300 grams per square meter, with the binder comprising approximately 17% by weight of the mixture.

While silica gel particles are preferred, other desiccant particles may be used. In particular, such particles include activated alumina, zeolite, calcium sulfate, calcium oxide and other particles that are hydrophilic and can provide a desiccant action for the contents of a container in which sheet 10 is placed. The particles may have a size in the range of 5 to 5000 microns.

Desiccant sheet 10 can be produced by other means. Hydrophilic particles may be adhered to an appropriate substrate with an adhesive. The particles may also be trapped in a bi-component fiber web. Other methods well known in the art may be used to produce desiccant sheet 10.

Figure 2:
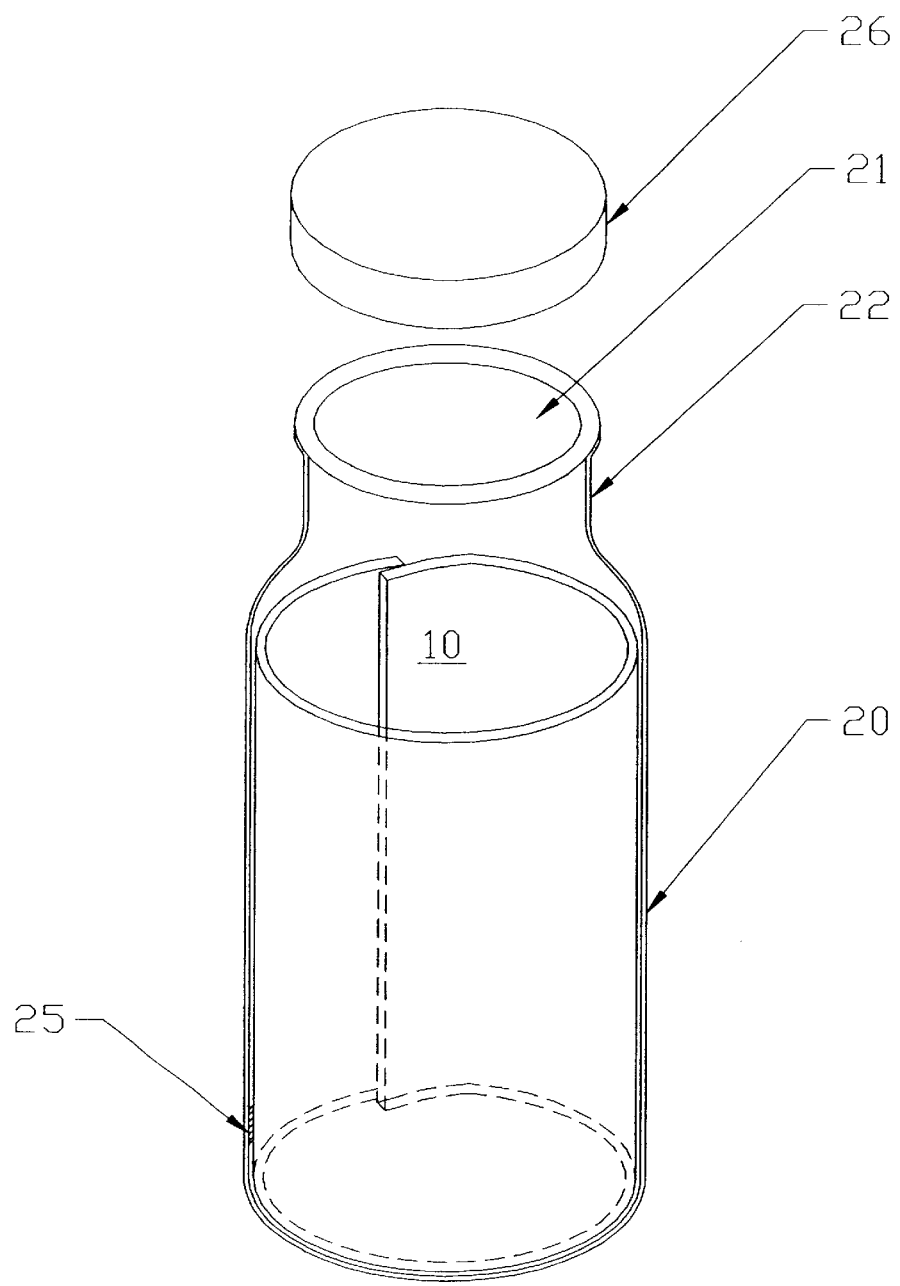
FIG. 2 is a perspective view of a bottle having a desiccant sheet in accordance with the invention, inserted there.

Referring to FIG. 2, a bottle 20, receives as a liner, a sheet 10 in accordance with FIG. 1. Sheet 10 is sized and shaped, such as by slitting and sheeting, to a configuration that allows it to be rolled up into a generally cylindrical shape, placed through the mouth 21 of bottle 20 and then released therein to expand so as to become a liner of at least a portion of bottle 20. Preferably, sheet 10 is thus disposed in bottle 20 at a position separate and apart from any cap or closure that may be applied to bottle 20. Sheet 10 preferably has characteristics that causes it to unfurl towards its normally flat configuration, and thus will become lodged against the wall of bottle 20. In a bottle 20 where neck 22 is smaller in diameter than the remainder of bottle 20, sheet 10 will be trapped within bottle 20. While it is possible to remove sheet 10 from bottle 20, depending upon the size of neck 22, it may be difficult, require significant manual dexterity or may require the use of special tools. In general, sheet 10 will remain trapped in bottle 20 and will not be lost or subject to contamination by dirt or bacteria. Accidental ingestion is not possible.

In cases where the mouth 21 and neck 22 of a bottle are large and of the same, or nearly the same, diameter as bottle 20, sheet 10 may be secured within bottle 20 by adhesive bonding thereto. Specifically, a small amount of a non-toxic adhesive 25 (shown, but not required in the embodiment of FIG. 2), may be applied to the one of substrates 12 or 14 that will come in contact with the inner surface of bottle 20. The adhesive is then allowed to set and the sheet is affixed within bottle 20.

As noted above, a sheet 10 having a single substrate and a composite layer with desiccant particles and binder particles fused thereto may also be used. If such layer is used, it is generally preferable that the single substrate be positioned so that it is facing, and in contact with, the contents of bottle 20. In this case, the single substrate must be water-vapor permeable. If a sheet having two substrates is used, at least one must be water vapor permeable and should face the contents when in place.

In use, bottle 20 is then filled with its customary contents which may include pharmaceuticals. A suitable humidity tight cap or cover 26 of the snap-on or screw-on variety, is then placed over the receiving end of mouth 21 to seal bottle 20. Suitable tamper resistant packaging is then used to package bottle 20, in a manner well known in the art.

When bottle 20 is used by the ultimate user or consumer, the tamper-proof packaging is removed and bottle 20 is opened by removing cap or cover 26 from mouth 21. Periodically, a portion of the contents is removed for use. After such removal, the bottle is again resealed by replacing cap or cover 26 over mouth 21.

It will be understood that sheet 10 will remain within bottle 20 during all such use. Sheet 10 will not be subject to loss, contamination by dirt or bacteria, or accidental ingestion by the consumer. Thus, the present invention provides an inexpensive and virtually foolproof way for keeping the contents generally free from moisture for the life of the product placed in bottle 20, or at least until the desiccant sheet becomes saturated. To the extent that sheet 10 covers a significant portion of the interior of bottle 20, it will also provide a cushioning effect for the contents thereof, tending to, for example, make the fragmenting of pills or tablets less likely if bottle 20 undergoes rough handling during shipping or use.

It will be understood that the present invention may be implemented in other ways. For example, it may be possible to mold a plastic bottle around a cylindrical sheet 10, or alternatively sheet 10 may be inserted into the mold that produces bottle 20. In either case, a structure similar to that described in detail herein, and having exactly the same functionality and advantages will be produced.

In certain cases, it may be advantageous to seal the edges of sheet 10 in any one of a variety of ways well known in the art, such as for example, by application of a sealant around the periphery, or by supplemental heating or welding (including ultrasonic welding) of the exposed edge thereof. This will assure that desiccant particles do not break away from sheet 10 so as to mix with the contents of bottle 20.

It should be understood that the foregoing description is only illustrative of the invention. Various alternatives and modifications can be devised by those skilled in the art without departing from the invention. Accordingly, the present invention is intended to embrace all such alternatives, modifications, and variances which fall within the scope of the appended claims.

What is claimed is:

1. A desiccant system comprising:
   a bottle having sidewalls thereof; and
   a desiccant sheet having characteristics that cause said desiccant sheet to unfurl within said bottle to a substantially flat configuration wherein said desiccant sheet comprises:
   a first substrate that faces contents to be placed in said bottle, the first substrate being water vapor permeable; and
   a composite layer formed on the first substrate, the composite layer including desiccant particles and binder particles having an average particle size of about 10 to about 30 microns, a portion of the binder particles adhering the desiccant particles to one another and a portion of the binder particles adhering the desiccant particles to the first substrate.

2. A desiccant system of claim 1 wherein said desiccant sheet comprises silica particles having an average particle size of about 5 to about 5000 microns.

3. A desiccant system of claim 1 wherein the desiccant particles are present in said desiccant sheet at about 70% to about 90% by weight of the composite.

4. A desiccant system of claim 1 wherein said desiccant sheet comprises about 17% by weight binder particles.

5. A desiccant system of claim 1 wherein the composite is applied at a density of about 300 g/m$^2$.

6. A desiccant system of claim 1 wherein the first substrate comprises a bi-component fiber web wherein the particles of the composite layer are trapped within the bi-component fiber web.

7. A desiccant system of claim 1 wherein said desiccant sheet further includes a second substrate and wherein the composite layer is formed between the first and second substrate such that the second substrate is in contact with the sidewalls of said bottle when said desiccant sheet is unfurled within said bottle.

8. A desiccant system of claim 1 further including an adhesive for securing said desiccant sheet within said bottle.

9. A desiccant system of claim 1 wherein edges of said desiccant sheet are sealed by one of application of a sealant, supplemental heating, and welding.

10. A desiccant system of claim 1 further including a cap or cover to said bottle.

11. A desiccant system of claim 1 wherein said desiccant sheet covers a significant portion of an interior of said bottle.

12. A desiccant system of claim 11 wherein said desiccant sheet cushions contents of said bottle.

* * * * *